United States Patent [19]
Tateno et al.

[11] Patent Number: 6,045,939
[45] Date of Patent: Apr. 4, 2000

[54] LITHIUM SECONDARY BATTERY HAVING THERMAL SWITCH

[75] Inventors: Tatsuo Tateno; Genjiro Nishikata, both of Ibaraki; Kenichiro Kami, Aichi, all of Japan

[73] Assignee: Sumitomo Chemical Co., Ltd., Osaka, Japan

[21] Appl. No.: 09/032,116

[22] Filed: Feb. 27, 1998

[30] Foreign Application Priority Data

Feb. 28, 1997 [JP] Japan ................................. 9-045942

[51] Int. Cl.⁷ ........................... H01M 10/50; H01M 2/00
[52] U.S. Cl. ............................. 429/62; 429/57; 429/58; 429/59; 429/61
[58] Field of Search .................... 429/57, 58, 59, 429/61, 62, 66; 320/134, 136, 154

[56] References Cited

U.S. PATENT DOCUMENTS

| | | | |
|---|---|---|---|
| 4,129,686 | 12/1978 | Kaduboski | 429/61 |
| 5,766,793 | 6/1998 | Kameishi et al. | 429/62 |

*Primary Examiner*—Maria Nuzzolillo
*Assistant Examiner*—Angela J. Martin
*Attorney, Agent, or Firm*—Sughrue, Mion, Zinn, Macpeak & Seas, PLLC

[57] ABSTRACT

Provided is a lithium secondary battery comprising an electrode assembly which consists of a cathode, an anode and a separator laminated therebetween, and a battery case in which the electrode assembly is placed, said lithium secondary battery characterized by having a thermal switch which has a mechanism for electrically connecting the cathode and the anode at a portion other than an active material-contained layer in accordance with an increase in the battery temperature. The lithium secondary battery can prevent itself from being left in a charged condition after having an unusual trouble, and can operate the safety device even when its internal pressure decreases.

24 Claims, 4 Drawing Sheets

LITHIUM SECONDARY BATTERY HAVING THERMAL SWITCH

BACKGROUND OF THE INVENTION

1. Field of the Invention

The present invention relates to a lithium secondary battery comprising an electrode assembly which consists of a cathode, an anode and a separator laminated therebetween, and a battery case in which the electrode assembly is placed.

2. Description of the Related Art

Generally, lithium secondary batteries have a structure comprising a sheet-shaped cathode having an active material-contained layer which is formed on a current collector and which uses a composite oxide of lithium and a transition metal as the active material, a sheet-shaped anode having an active material-contained layer which is formed on a current collector and which uses a carbon material as the active material and a separator having lithium ion conductivity and electron insulation therebetween, and these are placed in a metallic battery case and sealed in such a manner that a cathode and an anode are electrically disconnected from each other, so that the lithium secondary batteries are characterized by their high capacity, high voltage, high output, and the like.

The lithium secondary battery having such a high energy density generally have various safety mechanisms in order to secure their safety under abnormal conditions. For example, these mechanisms include: a safety valve mechanism according to which when the pressure inside the battery case rises extraordinarily, the safety valve transforms in order to mitigate the internal pressure or to safely release the internal gas outside (Japanese Patent Kokai Publication 2-288063); a pressure-sensitive cutoff mechanism according to which when the pressure inside the battery case rises extraordinarily due to an abnormal charging/discharging, the internal battery circuit is cut off in order to stop the abnormal charging/discharging (Japanese Patent Kokai Publication 2-288063); and a temperature-sensitive cutoff mechanism according to which when the battery temperature rises extraordinarily due to an abnormal charging/discharging, the resistance of the internal battery circuit is raised in order to stop the abnormal charging/discharging (Japanese Patent Kokai Publication 5-74493).

When these cutoff mechanisms of the internal battery circuit based on the pressure or temperature operate in response, for example, to the occurrence of trouble under a full-charged condition, the electrode assembly inside the battery is left under a full-charged condition even though it does not show a voltage at the external battery terminal because the internal battery circuit is cut off. Accordingly, if the battery is pierced with a conductive material such as a nail, crushed by an external pressure, or heated from the outside, there is a problem that the pressure may increase extraordinarily.

On the other hand, a battery where the terminals of the cathode and the anode are electrically connected via a diaphragm valve which transforms in accordance with an increase in the battery's internal pressure has been suggested (Japanese Patent Kokai Publication 7-201372). However, after the above-mentioned safety valve mechanism operates, the pressure inside the battery case decreases and this pressure-sensitive short-circuit mechanism may fail to make the short-circuit mechanism operate.

SUMMARY OF THE INVENTION

The object of the present invention is to provide a lithium secondary battery which can prevent itself from being left under a charged condition after having an unusual trouble, and also can operate the safety device even when the pressure inside the battery decreases, thereby having further improved safety.

The inventors have conducted studies in order to solve these problems, and have found a new mechanism which makes the safety device operate in accordance with an increase in the temperature inside the lithium secondary battery.

That is, the present invention relates to a lithium secondary battery comprising an electrode assembly which consists of a cathode, an anode and a separator laminated therebetween, and a battery case in which the electrode assembly is placed, and said lithium secondary battery has a thermal switch which has a mechanism for electrically connecting the cathode and the anode at a portion other than an active material-contained layer in accordance with an increase in the battery temperature.

Figure 1:
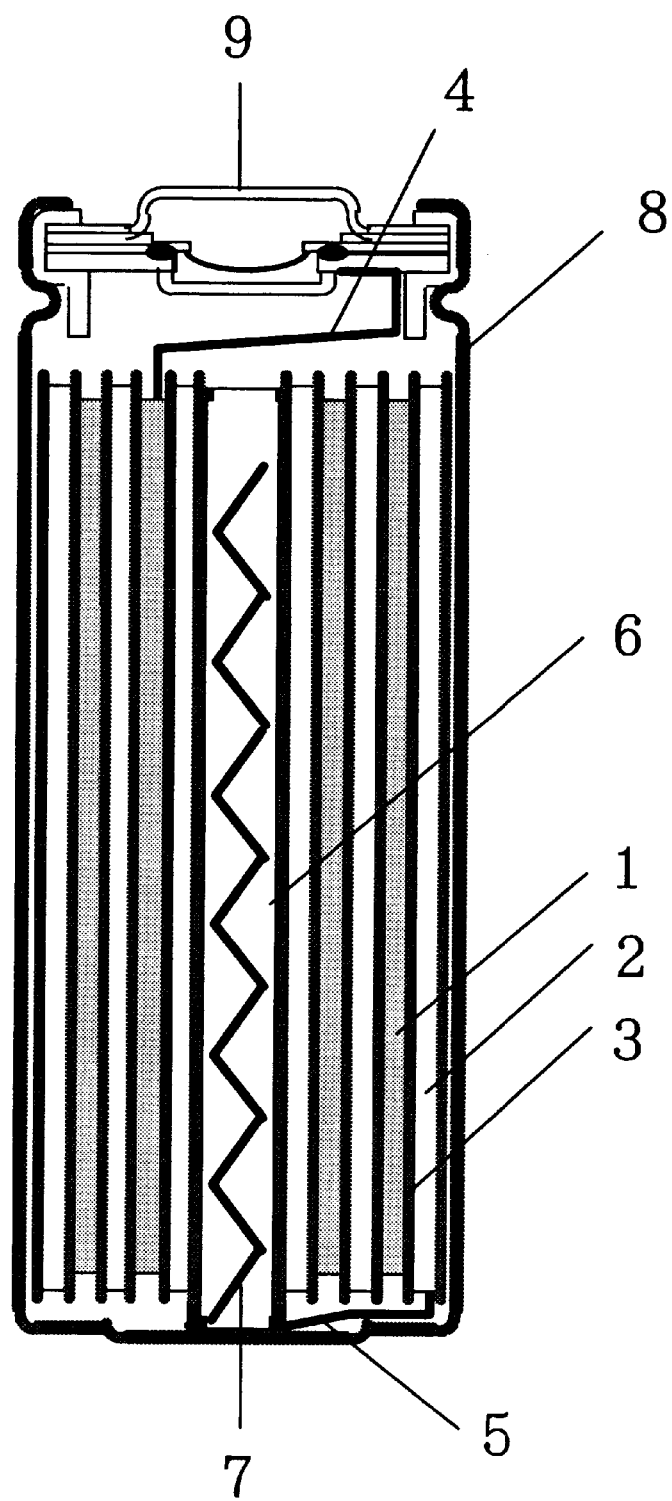
FIG. 1 is a cross sectional view showing the condition before the operation of the thermal switch in Example 1 of the present invention.

1: cathode sheet
2: anode sheet
3: separator
4: cathode lead
5: anode lead
6: tube for storing a thermal switch
7: thermal switch (shape memory alloy)
8: battery case
9: battery cap
10: electrode assembly

DETAILED DESCRIPTION OF THE INVENTION

As the cathode of the lithium battery of the present invention, a cathode having an active material-contained layer which is formed on a current collector and which uses a composite oxide of lithium and a transition metal as the active material can be used, and especially a sheet-shaped cathode is preferable. As the anode of the present invention, an anode having an active material-contained layer which is formed on a current collector and which uses a carbon material or a composite oxide of lithium and a transition metal as an active material can be used, and especially a sheet-shaped anode is preferable. In the lithium secondary battery of the present invention, the cathode and the anode are laminated with a separator therebetween, and the separator has lithium ion conductivity and electron insulation.

The cathode active material used for the lithium secondary battery of the present invention can be doped and undoped with lithium by charging and discharging the battery. For example, a composite oxide of lithium and a transition metal such as cobalt, nickel, or manganese, or said composite oxide containing additional elements can be used.

The current collector of the cathode used for the lithium secondary battery of the present invention is electrochemically stable at the cathode potential. For example, aluminum foil, nickel foil, stainless steel foil, or titanium foil can be used.

The anode active material used for the lithium secondary battery of the present invention can be doped and undoped with lithium by charging and discharging the battery. For example, a carbon material or a composite oxide of lithium and a transition metal whose potential is lower than the cathode active material can be used.

The current collector of the anode used for the lithium secondary battery of the present invention is electrochemically stable at the anode potential. For example, copper foil, nickel foil, stainless steel foil, or titanium foil can be used.

The separator used for the lithium secondary battery of the present invention has lithium ion conductivity and electron insulation. For example, a microporous film contained a nonaqueous electrolyte or a solid or semisolid electrolyte can be used. The nonaqueous electrolyte referred to here comprises an organic solvent and a lithium compound such as $LiPF_6$, $LiBF_4$, $LiClO_4$, or $CF_3SO_3Li$ dissolved in the organic solvent.

The thermal switch used for the lithium secondary battery of the present invention has a mechanism for electrically connecting cathode and anode at a portion other than the active material-contained layer in accordance with an increase in the temperature of the battery. If these electrodes are electrically connected with each other at the active material layer, then the temperature of cathode active material at the connecting portion undesirably increases, which facilitates the release of oxygen from the cathode active material under a charged condition, thereby deteriorating its safety.

The operating temperature of the thermal switch is preferably 80° C. to 140° C., and more preferably 90° C. to 110° C. If the operating temperature is below 80° C., then the thermal switch might operate while the battery is in use, whereas when the temperature is above 140° C., it makes oxygen to be released more easily from the cathode active material under a charged condition.

The thermal switch used for the lithium secondary battery of the present invention can be in the inside of the battery or the outside of the battery. The inside of the battery referred to here means the space surrounded by the battery case and the battery cap, and the outside of the battery means the portion other than said inside of the battery. For example, in case of the outside of the battery the thermal switch can be placed at the battery case or the battery cap. When the thermal switch is in the inside of the battery, the oxygen concentration of the gas inside the battery is equal to or lower than the maximum value of the oxygen concentration which does not cause a combustion of the gas inside the battery. On the other hand, when the thermal switch is in the outside of the battery, the oxygen concentration of the gas around the thermal switch is equal to or lower than the maximum value of the oxygen concentration which does not cause a combustion of the gas around the thermal switch.

In most cases, the nonaqueous electrolytes used for the lithium secondary battery of the present invention contain combustible organic solvent, and further contain the combustible gas corresponding to the vapor pressure of the solvent and hydrocarbons decomposed by the initial charging and discharging. As the hydrocarbons, methane, carbon monoxide or ethylene can be indicated although it depends on the solvent used. Since the electrode assembly using a nonaqueous electrolyte contains a slight amount of water although it depends on production environments, so that a slight amount of hydrogen gas may exist as a result of electrolysis at the initial charge of the battery.

Here, the maximum value of the oxygen concentration refers to the highest oxygen concentration which does not cause the combustible gas to burn due to a temperature rise in the mixture of combustible gas, oxygen, and inert gas. The inert gas can be nitrogen, carbon dioxide, argon, helium, or the like.

The maximum value of the oxygen concentration at which combustible gas does not burn changes according to the temperature, the pressure and the inert gas added. In case of methane gas, for example, it is 14.6% by volume when carbon dioxide is added at room temperature and atmospheric pressure (page 743 in HANDBOOK OF ELECTROSTATICS edited by The Institute of Electrostatics Japan). The maximum value of the oxygen concentration in the present invention is preferably below 10% by volume, and more preferably below 5% by volume when the presence of hydrogen gas, although little amount, is taken into consideration.

As a method of controlling the oxygen concentration inside the lithium secondary battery of the present invention, it is preferable to control the oxygen concentration of the work atmosphere at the process of sealing a battery with a battery cap because of its industrial easiness. For example, a process of sealing a battery with a battery cap is conducted in a sealed box, and the atmosphere inside the box (about 79% of nitrogen and about 21% of oxygen by volume) is substituted by inert gas such as nitrogen, argon, helium, or carbon dioxide while the oxygen concentration is being measured. This makes it possible to control the oxygen concentration inside the sealed box.

In the lithium secondary battery of the present invention, the thermal switch may be a device using a temperature-sensitive material of a suitable electrical resistance. It is preferable that at least one material selected from the group consisting of a shape memory alloy, a thermal expansion material, a spring, temperature-sensitive ferrite, and a bimetal is applied to the mechanism for electrically connecting a cathode and an anode in accordance with an increase in the battery temperature. It is preferable that these materials are electrochemically stable at the potential of the electrode unit to be connected. For example, in the case of the shape memory alloy, a titanium/nickel alloy can be used, and in the case of the thermal expansion material, a lamination plate of an electrochemically stable metal and a resin can be used. In the case of the spring, a combination with a thermoplastic resin can be used. It is preferable that the temperature-sensitive ferrite, the bimetal, or the like to be used are also electrochemically stable. However, when the structure of the thermal switch does not contact with the electrolyte, the temperature-sensitive materials are not limited thereto.

The electrical resistance of the thermal switch having the mechanism for electrically connecting the cathode and the anode in accordance with an increase in the battery temperature is preferably 0.01~100 ohm, more preferably 0.1~10 ohm.

PREFERRED EMBODIMENTS OF THE INVENTION

The present invention will be described in detail with reference to the drawings, without being limited thereto.

EXAMPLE 1

FIG. 1 shows an embodiment of a lithium secondary battery of the present invention. An active material-contained cathode sheet 1 having lithiated nickel dioxide as its main component and being electrically connected with an aluminum cathode lead 4, and an active material-contained anode sheet 2 having graphite material as its main component and being electrically connected with a nickel anode lead 5 were laminated with a polypropylene separator 3 therebetween, coiled to form an electrode assembly, and placed in a nickel-plated steel battery case 8. Then, the anode lead 5 was electrically connected with the battery case 8, whereas the cathode lead 4 was electrically connected with the battery cap 9 comprising a safety mechanism for releasing the internal gas outside, thereby preventing explosion when the pressure inside the battery case rose extraordinarily, and a temperature-sensitive cutoff mechanism for raising the resistance of the internal battery circuit when the battery temperature rose extraordinarily due to an abnormal charging/discharging, thereby preventing the continuation of the abnormal charging/discharging. Then, an organic solvent electrolyte was poured into the battery in the box under argon environments (oxygen concentration is below 1% by volume). A straight shape memory alloy 7 (electrical resistance is about 0.2 ohm) having a 0.5 mm φ diameter, which was made from a titanium/nickel alloy, was coiled and placed in the stainless steel tube 6, and the stainless tube 6 was placed in the central space of the electrode assembly. Then, the battery cap 9 was attached to the battery case 8 via an insulating packing, so as to complete a sealed-type cylindrical battery.

Then, the battery was charged and discharged, and an external heating test was conducted under the conditions of the battery capacity of 800 mAH. As the heating test, the battery was disposed inside a copper block and the temperature was raised at the rate of 5° C./minute while the battery voltage was being monitored, and as a result, the battery voltage started to decrease when the temperature reached around 100° C. The battery did not explode or ignite even after the temperature exceeded 200° C. The battery voltage was about 0.5V at 200° C.

Figure 2:
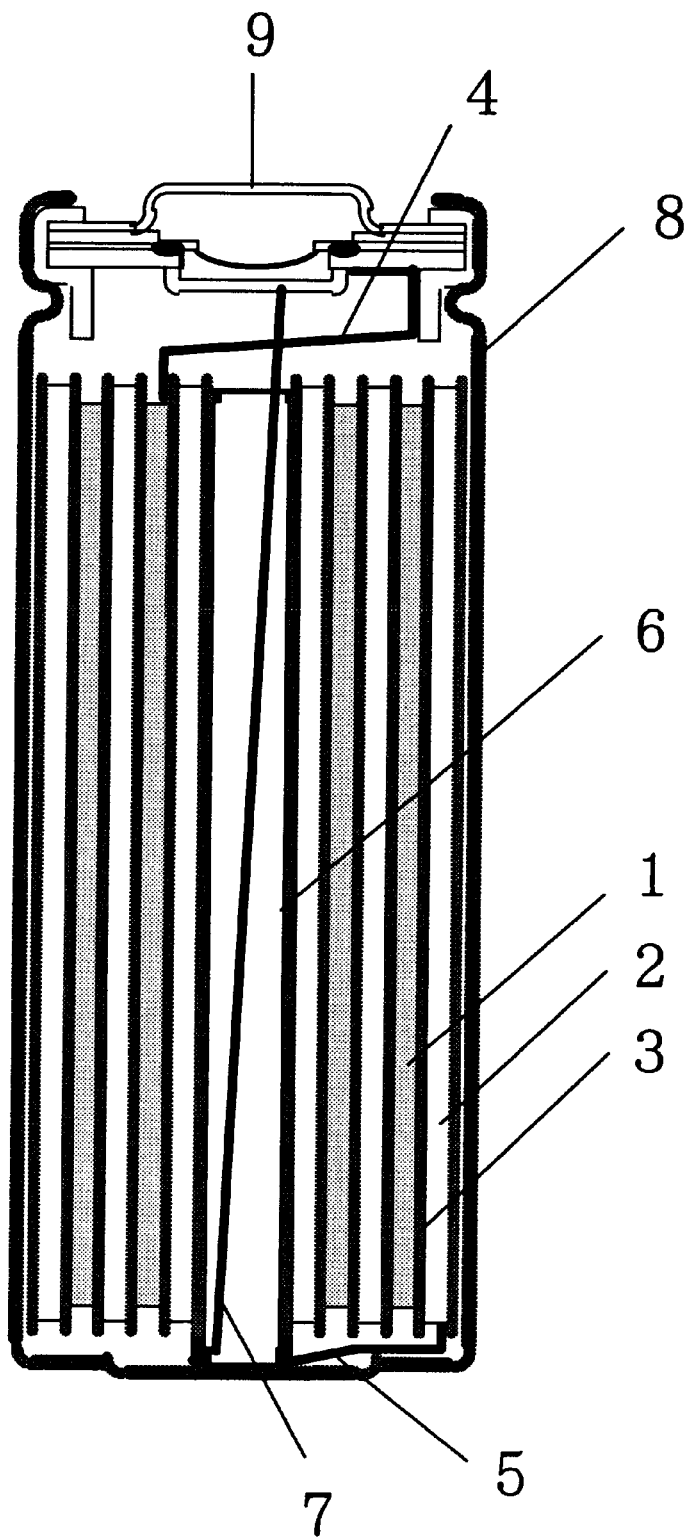
FIG. 2 is a cross sectional view showing the condition after the operation of the thermal switch in Example 1 of the present invention.

According to the lithium secondary battery, the straight shape memory alloy 7 coiled as shown in FIG. 1 is transformed into a straight form as shown in FIG. 2, so that the cathode and the anode are electrically connected with each other at the bottom of the battery case (anode) and the battery cap (cathode), which makes the thermal switch mechanism operative. After the operation of this mechanism, at what temperature the operation may be suspended and the battery may be left, the battery self-discharges and decreases its capacity, so that the safety of the battery is enhanced.

EXAMPLE 2

Figure 3:
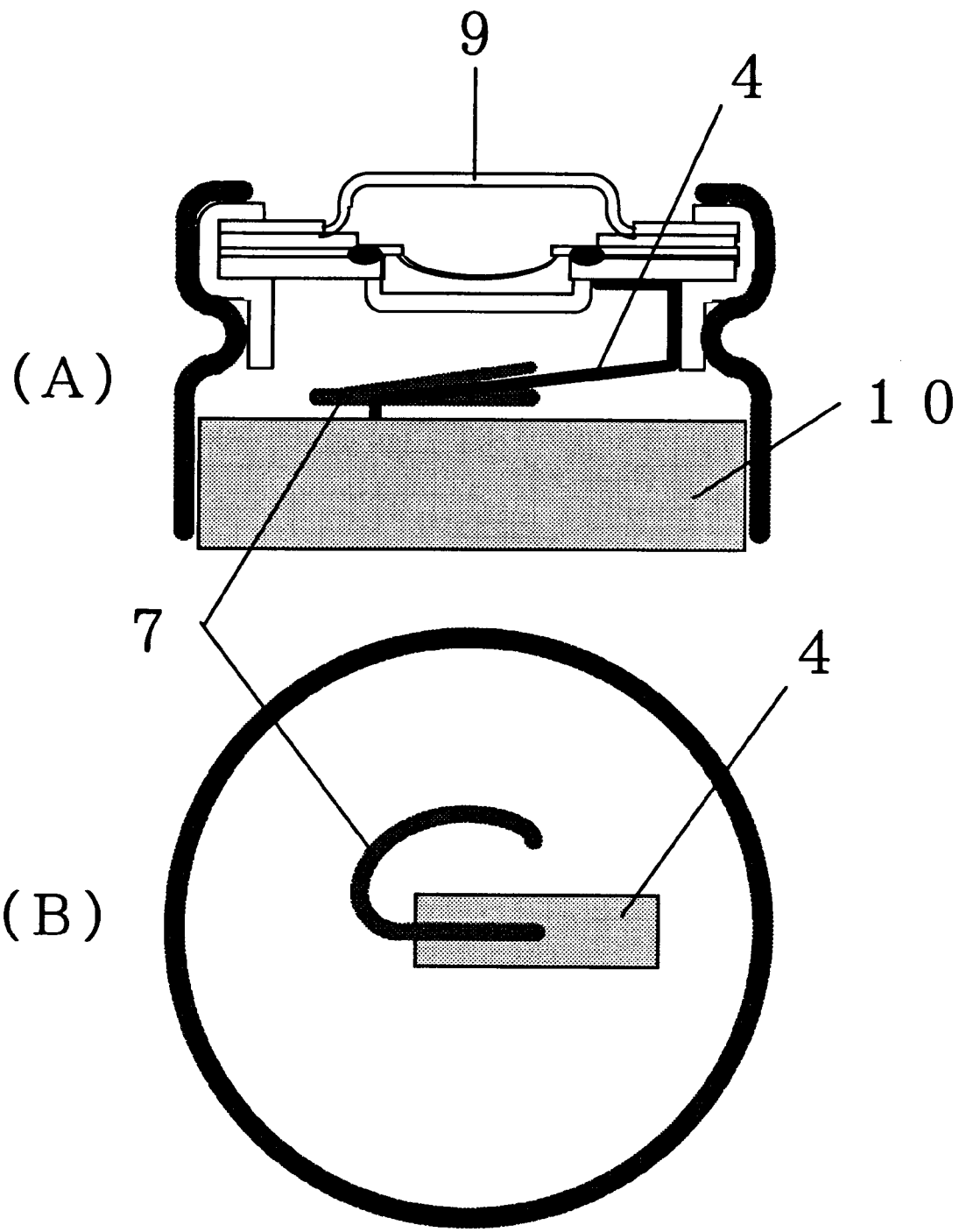
FIG. 3 is a cross sectional view (A) and a plane view (B) showing the condition before the operation of the thermal switch in Example 2 of the present invention.
Figure 4:
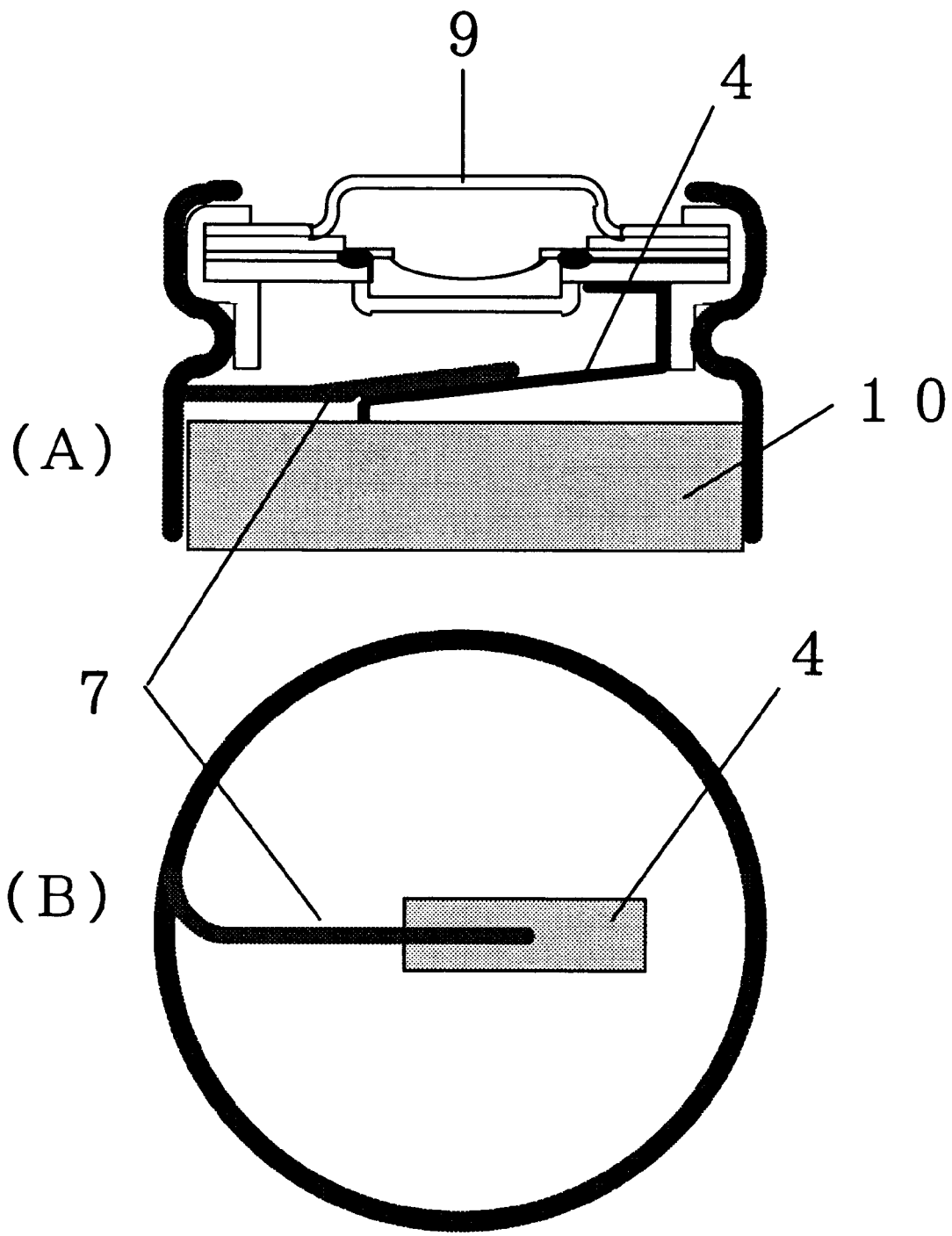
FIG. 4 is a cross sectional view (A) and a plane view (B) showing the condition after the operation of the thermal switch in the Example 2 of the present invention.

FIGS. 3 and 4 show another embodiment of lithium secondary of the present invention. FIG. 3 shows an illustration of the lithium secondary battery before the operation, and FIG. 4 shows an illustration of the lithium secondary battery after the operation. In FIG. 3, the straight shape memory alloy 7 is arranged in such a manner as to be electrically connected with the cathode lead 4 and to be electrically disconnected with the anode. In accordance with an increase in the battery temperature, the straight shape memory alloy 7 transforms so as to be electrically connected with the wall of the battery case, which is the anode (FIG. 4).

COMPARATIVE EXAMPLE 1

Another battery was prepared comprising a safety mechanism which operated when the pressure inside the battery case rose extraordinarily, so as to release the internal gas outside, thereby preventing explosion, a temperature-sensitive cutoff mechanism which operated when the battery temperature rose extraordinarily due to an abnormal charging/discharging, so as to raise the resistance of the internal battery circuit, thereby preventing the continuation of the abnormal charging/discharging, and a pressure-sensitive cutoff mechanism which operated when the pressure inside the battery case rose extraordinarily, so as to cut off the internal battery circuit.

After this battery was charged and discharged, the discharge capacity was 1100 mAH. When the same external heating test as above was applied to this battery under the conditions of the battery capacity of 1050 mAH, a slight leakage of the electrolyte was observed at around 160° C., and then the battery voltage became 0 V. This seems to result from an increase in the battery's internal pressure having made the pressure-sensitive mechanism operate, thereby cutting off the internal battery circuit.

According to such a pressure-operating cutoff mechanism of the internal battery circuit, when the mechanism operates at the end of charging, for example, by an unusual trouble in the charging circuit, the electrode assembly inside the battery is left in a full-charged condition although it does not show the voltage at the external battery terminal because the internal battery circuit is cut off. Thus, it can be said that the battery is in a very dangerous condition.

In contrast, the lithium secondary battery of the present invention self-discharges and is put in a discharged condition by the operation of the thermal switch mechanism, so that its safety is secured.

The lithium secondary battery of the present invention can prevent itself from being left in a charged condition after having an unusual trouble, and can operate the safety device even when its internal pressure decreases. Such a lithium secondary battery with improved safety has a large industrial value.

What is claimed is:

1. A lithium secondary battery comprising an electrode assembly which comprises
   a cathode comprising an active material-containing layer,
   an anode comprising an active material-containing layer,
   a separator laminated between the cathode and anode,
   a battery case in which the electrode assembly is placed, and
   a thermal switch which has a mechanism capable of electrically connecting the cathode and the anode at a portion other than the active material-containing layers in accordance with an increase in the battery temperature.

2. A lithium secondary battery according to claim 1, wherein said thermal switch is in the inside of the battery and the oxygen concentration of the gas inside the battery is equal to or lower than the maximum value of the oxygen concentration which does not cause a combustion of the gas inside the battery.

3. A lithium secondary battery according to claim 1, wherein said thermal switch is on the outside of the battery and the oxygen concentration of the gas around the thermal switch is equal to or lower than the maximum value of the oxygen concentration which does not cause a combustion of the gas around the thermal switch.

4. A lithium secondary battery according to claim 2, wherein said oxygen concentration is less than 10% by volume.

5. A lithium secondary battery according to claim 1, wherein at least one which is selected from the group consisting of a shape memory alloy, a thermal expansion material, a spring temperature-sensitive ferrite, and a bimetal is applied to said thermal switch.

6. A lithium secondary battery according to claim 1, wherein the electrical resistance of said thermal switch is from 0.01 to 100 ohm.

7. A lithium secondary battery according to claim 1, wherein the electrical resistance of said thermal switch is from 0.1 to 10 ohm.

8. A lithium secondary battery according to claim 1, wherein the cathode comprises a cathode lead.

9. A lithium secondary battery according to claim 1, wherein the cathode comprises a battery cap connected to the cathode lead.

10. A lithium secondary battery according to claim 1, wherein the anode comprises an anode lead.

11. A lithium secondary battery according to claim 10, wherein the anode comprises the battery case connected to the anode lead.

12. A lithium secondary battery according to claim 8, wherein the mechanism capable of electrically connecting the cathode and the anode is electrically connected with the cathode lead and electrically disconnected from the anode.

13. A lithium secondary battery according to claim 11, wherein the mechanism capable of electrically connecting the cathode and the anode is electrically connected with the battery case and electrically disconnected from the cathode.

14. A lithium secondary battery according to claim 1, wherein the cathode active material-containing layer is formed on a current collector and comprises a composite oxide of lithium and a transition metal as an active material.

15. A lithium secondary battery according to claim 1, wherein the anode active material-containing layer is formed on a current collector and comprises a carbon material or a composite oxide of lithium and a transition metal as an active material.

16. A lithium secondary battery according to claim 1, wherein the separator has lithium ion conductivity and electron insulation.

17. A lithium secondary battery according to claim 1, wherein the cathode active material comprises a composite oxide of lithium and a cobalt, nickel, or manganese transition metal.

18. A lithium secondary battery according to claim 1, wherein the anode active material comprises a carbon material or a composite oxide of lithium and a transition metal whose potential is lower than the cathode active material.

19. A lithium secondary battery according to claim 1, wherein the operating temperature of the thermal switch is from 80° C. to 140° C.

20. A lithium secondary battery according to claim 1, wherein the operating temperature of the thermal switch is from 90° C. to 110° C.

21. A lithium secondary battery according to claim 1, wherein the battery is sealed in the presence of a nitrogen, argon, helium, or carbon dioxide inert gas.

22. A lithium secondary battery according to claim 1, wherein upon activation of the thermal switch the battery self-discharges and decreases its capacity.

23. A lithium secondary battery according to claim 9, wherein upon activation of the thermal switch mechanism the thermal switch connects the battery cap and the battery case.

24. A lithium secondary battery according to claim 8, wherein upon activation of the thermal switch mechanism the thermal switch connects the cathode lead and the battery case.

* * * * *